United States Patent
Kunze et al.

(10) Patent No.: US 9,605,576 B2
(45) Date of Patent: Mar. 28, 2017

(54) MOUNTING MAT

(75) Inventors: Ulrich Kunze, Juechen (DE); Stefan R. Reimann, Bruehl (DE); Harald H. Krieg, Neuss (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 567 days.

(21) Appl. No.: 13/395,930

(22) PCT Filed: Sep. 17, 2010

(86) PCT No.: PCT/US2010/049271
§ 371 (c)(1),
(2), (4) Date: Mar. 14, 2012

(87) PCT Pub. No.: WO2011/035116
PCT Pub. Date: Mar. 24, 2011

(65) Prior Publication Data
US 2012/0171081 A1    Jul. 5, 2012

(51) Int. Cl.
*B01D 50/00* (2006.01)
*F01N 3/28* (2006.01)
*F01N 3/021* (2006.01)

(52) U.S. Cl.
CPC .......... *F01N 3/2864* (2013.01); *F01N 3/0211* (2013.01); *F01N 3/2857* (2013.01); *F01N 2350/02* (2013.01); *F01N 2450/02* (2013.01); *Y02T 10/20* (2013.01); *Y10T 29/49826* (2015.01)

(58) Field of Classification Search
CPC .... F01N 3/2853; F01N 3/2864; F01N 3/2867; F01N 3/2871; F01N 3/28
USPC .......... 422/177, 179; 428/77, 194, 198, 201, 428/920; 29/890
See application file for complete search history.

(56) References Cited

U.S. PATENT DOCUMENTS

| | | |
|---|---|---|
| 3,916,057 A | 10/1975 | Hatch |
| 4,048,363 A | 9/1977 | Langer |
| 4,305,992 A | 12/1981 | Langer |
| 5,028,397 A | 7/1991 | Merry |
| 5,032,441 A | 7/1991 | Ten Eyck |

(Continued)

FOREIGN PATENT DOCUMENTS

| | | |
|---|---|---|
| EP | 0396330 | 7/1994 |
| EP | 1495807 | 1/2005 |
| WO | WO 2004/011785 | 2/2004 |

OTHER PUBLICATIONS

PCT International Search Report for PCT/US2010/049271, mailed Dec. 6, 2010.

*Primary Examiner* — Tom P Duong

(57) ABSTRACT

A mounting mat for a pollution control device is disclosed. The device comprises at least a first sheet and a second sheet and at least one holding means for holding the at least first and second sheets together. The holding means are adapted to (i) hold the at least first and second sheets together while allowing movement of the at least first and second sheets parallel to each other in the region where the holding means is positioned; and/or (ii) to break upon wrapping around a body thereby allowing movement of the at least first and second sheets parallel to each other in the region where the holding means is positioned. A pollution control device containing such a mat and method of making a pollution control device containing such a mat are also disclosed.

20 Claims, 5 Drawing Sheets

(56) References Cited

U.S. PATENT DOCUMENTS

| | | | |
|---|---|---|---|
| 5,332,609 A | 7/1994 | Corn | |
| 5,882,608 A | 3/1999 | Sanocki | |
| 6,158,120 A | 12/2000 | Foster | |
| 6,670,020 B1 | 12/2003 | Maus | |
| 8,038,758 B2 | 10/2011 | Saiki | |
| 8,268,255 B2 | 9/2012 | Yoshimi | |
| 2007/0107394 A1* | 5/2007 | Jankowski | 55/523 |
| 2007/0140929 A1 | 6/2007 | Watanabe | |
| 2011/0023430 A1* | 2/2011 | Kumar et al. | 55/486 |

* cited by examiner

MOUNTING MAT

CROSS REFERENCE TO RELATED APPLICATIONS

This application is a national stage filing under 35 U.S.C. 371 of PCT/US2010/049271, filed Sep. 17, 2010, which claims priority to European Application No. 09170723.2, filed Sep. 18, 2009, the disclosures of which are incorporated by reference in their entireties herein.

The present invention relates to a mounting mat, in particular a mounting mat for mounting a pollution control element within a housing.

Gas processing devices, in particular pollution control devices such as catalytic converters, comprise a pollution control element, which is often a catalyst support, contained within a housing or casing. Pollution control elements are often made of ceramic materials having skeleton or honeycomb type structures. Due to their material and the construction, pollution control elements can be very brittle and as such care must be taken regarding the mounting of such pollution control elements in their housings. A mounting mat can be used to fill the space between the pollution control element and the housing, to prevent the pollution control element from moving about inside the housing and to reduce possible shock being transmitted to the pollution control element which may cause the pollution control element to crack or fracture. In addition, the housing, pollution control element and mounting mat may be subjected to extreme cyclic heating and cooling during use.

There are two types of mat generally used for mounting pollution control elements: intumescent mats and non-intumescent mats. Intumescent mats are formed from materials that expand and contract with the heating and cooling cycles of the catalytic converter such that the gap between the housing and pollution control element is always filled. This means that the pollution control element is unable to move relative to the housing. Non-intumescent mats are typically constructed such that they are slightly thicker than the gap between the pollution control element and the housing. This means that the mat is always under some compression in contact with the pollution control element and the walls of the housing, and hence movement of the pollution control element within the housing is prevented. In each case, the mat is designed to prevent leakage of gases around the pollution control element.

Catalytic convertors using intumescent mats commonly comprise one mat, i.e. a generally rectangular-shaped sheet of material, which is wrapped around the outer peripheral surface of the pollution control element, prior to inserting into the housing. A problem associated with using a single mat is that a mat of suitable thickness to produce adequate mounting pressure may crack (particularly on the outer surface) or buckle (particularly on the inner surface) during wrapping around the pollution control element.

It has previously been proposed that a laminate comprising two sheets of material could be used to alleviate the cracking or buckling problem as the two sheets are free to move relative to each other during the wrapping process.

FIG. 1 is a diagrammatic illustration of a two layer mounting mat. The mounting mat 1 comprises two sheets 2, 3, wherein each sheet comprises an inner surface 4, 5 and an outer surface 6, 7 and are arranged such that the inner surfaces 4, 5 of each sheet are in contact with each other. The sheets are held together at the central region 8 by an adhesive bond 9 between the inner surfaces 4, 5 of the two sheets. The uppermost sheet 2 in FIG. 1 represents the inner sheet when wrapped around the pollution control element, and the lower sheet 3 represents the outer sheet when wrapped around the pollution control element.

Once the mounting mat is formed, it is wrapped around a pollution control element, typically by hand, and inserted into a housing, in a process known as canning, typically carried out by machine. Bonding the sheets together as in FIG. 1 prevents the sheets forming the mounting mat from being free to move against each other and the inner walls of the housing, which helps to stop any cracking and/or buckling of the mat.

This two-layer mat design is typical within the automotive industry. For example, U.S. Pat. No. 5,032,441 and U.S. Pat. No. 5,332,609, both described intumescent mounting mats where two sheets are held together at the centre of the mat or at one end of the mat.

However, for mass market products, using individual operators to wrap and stuff each mounting mat is time consuming and costly. It is therefore often preferred for more cost effective manufacturing that both wrapping and canning are conducted by an automated process. This may involve a robot picking up a mounting mat from a pile and transferring it to a device, which wraps it around the pollution control element. It is desirable that the ends of the mats or the parts of the mats where the sheets are not bonded together are not allowed to drop down or separate when the mounting mat is picked up. For example, it can be seen in FIG. 1 that the ends of the sheets which are not fastened together may separate creating a gap 10 during handling. If the ends or any other part of the mats are allowed to separate, there is a risk that first and second sheets can fold or curl up, making the wrapping and subsequent canning stages difficult to complete successfully. This could result in a high rate of rejects, cracking of the pollution control elements during stuffing, or exhaust gases bypassing the pollution control element during use. There is a need therefore to be able to guarantee that the laminates used in automated processes are fold and curl free such that wrapping and canning can be completed effectively.

The present invention aims to address these problems by providing a mounting mat for a pollution control device, comprising: at least a first sheet and a second sheet; at least one holding means for holding the at least first and second sheets together, wherein the holding means are adapted to: (i) hold the at least first and second sheets together whilst allowing movement of the at least first and second sheets parallel to each other in the region where the holding means is positioned; and/or (ii) break upon wrapping around a body thereby allowing movement of the at least first and second sheets parallel to each other in the region where the holding means is positioned.

By using a holding means to hold the sheets of the mounting mat together, the mounting mat does not separate during picking up and carrying particularly during an automated process. In addition, the holding means allow movement of the sheets parallel to each other during the wrapping process, preventing buckling and cracking.

Preferably, at least two holding means are positioned on the mat such that the sheets are held together at opposite edge regions of the mat. More preferably, at least three holding means are positioned on the mat such that the sheets are held together at opposite edge regions of the mat and a region between the opposite edge regions of the mat. In this situation, holding means of a first type and holding means of a second type may be provided.

Preferably, the holding means are one of: pins, staples, ties, bands, threads, regions of adhesive and flexible linkages.

The mounting mat may further comprise a fixation means adapted to hold the at least first and second sheets substantially in contact with each other such that movement of the at least first and second sheets in a direction perpendicular to the plane of the at least first and second sheet is substantially restricted in the region where the fixation means is positioned.

This fixation means is preferably positioned in a central region of the mat. The fixation means may comprise at least one zone of adhesive.

The holding means may be formed of a material that burns off at a temperature exceeding 200° C.

At least one edge of one of the at least first and second sheets may be offset from the corresponding edge of the other of the at least first and second sheets.

Preferably, the first and second sheets comprise nonwoven sheets of inorganic fibres. More preferably, the first sheet and/or the second sheet comprises an intumescent material. Alternatively, the first sheet and/or the second sheet preferably comprises a non-intumescent material.

The invention also provides a pollution control device comprising: a housing; a pollution control element arranged within the housing; and a mounting mat as described above, wherein the mounting mat is disposed in a gap defined between the housing and the pollution control element.

The invention yet further provides a method of making a pollution control device comprising: providing a mounting mat as above; wrapping the mounting mat around a pollution control element; and arranging the mounting mat and pollution control element within a housing.

Preferably the mounting mat is transferred from a storage area to a processing area by an automated carrying means. More preferably the automated carrying means is a robot.

The present invention will now be described by way of example only, and with reference to the accompanying drawings in which:

FIG. 1, referred to above, is a diagrammatic illustration of a two layer mounting mat;

The embodiments of the present invention described below illustrate how the handling of a multilayer mounting mat for a gas processing device according to the prior art, before and during the wrapping process, can be improved. This improvement in handling is achieved by introducing a holding means to hold the non-secured parts of the mat together.

Figure 1:
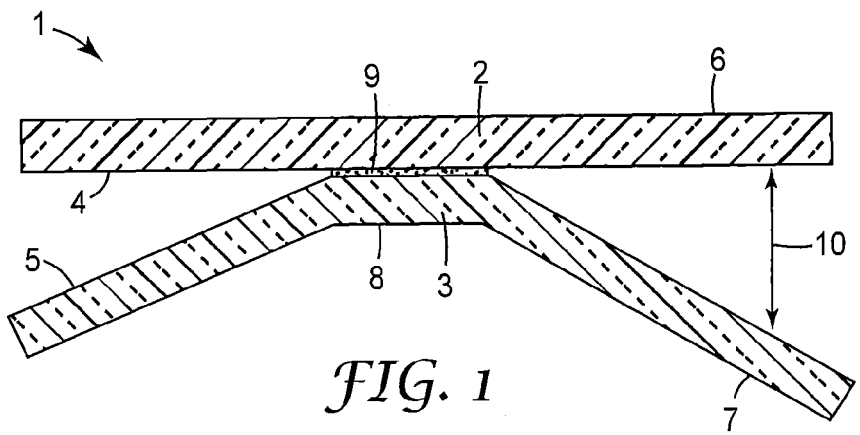
Figure 2A:
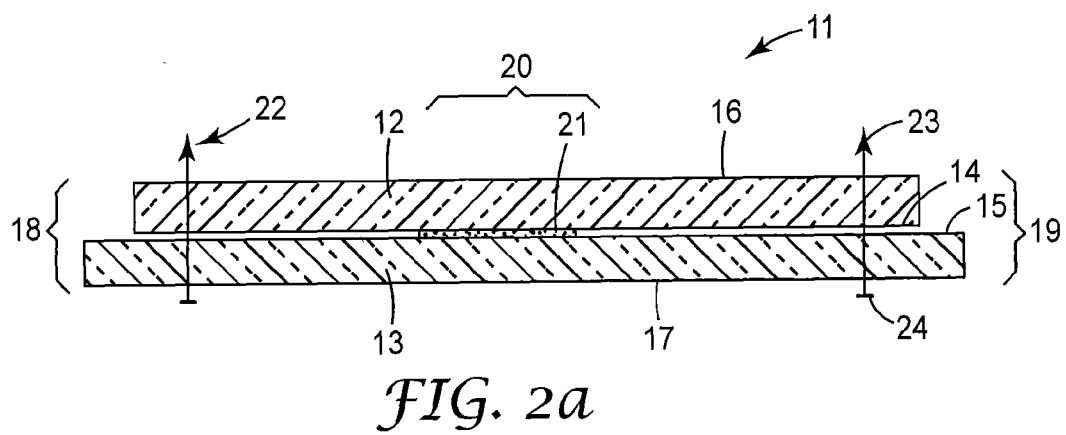
FIG. 2a is a diagrammatic side view of a two layer mat according to a first embodiment of the present invention.

FIG. 2a is a diagrammatic side view of a two layer mat according to a first embodiment of the present invention. The mat 11 comprises first 12 and second 13 sheets, each of which has inner 14, 15 and outer 16, 17 surfaces respectively. The first 12 and second 13 sheets are generally rectangular in shape, having opposite edge regions 18, 19 and a central region 20 disposed between the opposite edge regions. A fixation means 21 formed from a zone of adhesive (3M Transfer Tape 950, available from 3M, 3M Center, St. Paul, Minn. 55144-1000 USA) is provided in the central region 20 of the first 12 and second 13 sheets to hold the first 12 and second 13 sheets together such that they are substantially in contact with one another. The fixation means 21 is arranged such that movement of the first 12 and second 13 sheets in a direction perpendicular to the plane of the sheets is substantially restricted in the region where the fixation means 21 is positioned.

The opposite edge regions 17, 18 of the two sheets that are not held together by the fixation means 21 are held together by holding means 22 comprising a thread or a plurality of threads. The holding means 22 hold the first 12 and second 13 sheets together whilst allowing movement of the first 12 and second 13 sheets parallel to each other in the region where the holding means 22 is positioned. The leading end 23 of each thread 22, that is the end of the threads that penetrate the first 12 and second 13 sheets is provided with a pointed retaining means to allow penetration through the sheets, such that once the threads have fully penetrated both sheets, the threads can not be pulled back through the sheets. The opposing end 24 of the threads 22 have retaining means that prevent them from being pull through the sheets. The retaining means prevent the threads 22 from being removed either on purpose, or accidentally during movement of the first 12 and second 13 sheets. This ensures that the edge regions of the sheets do not separate substantially during handling, and movement of the sheets parallel to each other in the region where the threads are positioned is allowed during the wrapping process.

Figure 2B:
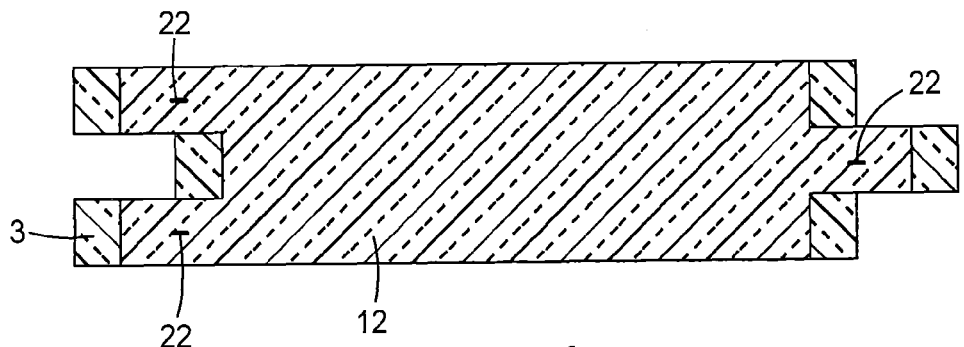
FIG. 2b is a diagrammatic top view of a two layer mat according to a first embodiment of the present invention.

FIG. 2b is a diagrammatic top view of a two layer mat according to a first embodiment the present invention. Three threads 22 are shown in FIGS. 2a and 2b, however, the quantity of threads used in the construction of the mat may vary depending on the size, shape and thickness of the sheets that are held together and the particular application. For example, a thread 22 may be inserted through both of the first 12 and second 13 sheets in the region of each corner of the first 12 and second 13 sheets, or in a line extending substantially along the length of one edge of the first 12 and second 13 sheets.

Suitable threads may be rigid, flexible or have elastic properties, each of which may be chosen specifically for a particular mat material or pollution control element design. The length of the threads is chosen such that they restrict movement of the sheets perpendicular to each other during handling but do not restrict the movement of the sheets parallel with each other during wrapping. The threads are required to have sufficient strength that they are not damaged during handling of the mat, but may break upon wrapping of the mat around a body, for example, a pollution control element. Furthermore, the threads may be formed of a material that burns off at the operating temperature of a gas processing device, during use of the device, where typical operating temperatures are likely to exceed 200° C. A suitable type of thread for some applications would be such as "Banok Nylon Microspace fein" available from Werner Becker Systeme zur Warenauszeichnung oHG, Liebigstr. 1, D 82256, Germany. Alternative holding means such as pins or staples may be used, if preferred.

Figure 3A:
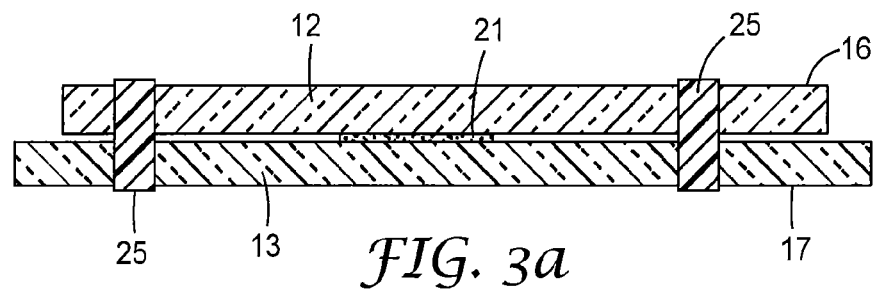
FIG. 3a is a diagrammatic side view of a two layer mat according to a second embodiment of the present invention.
Figure 3B:
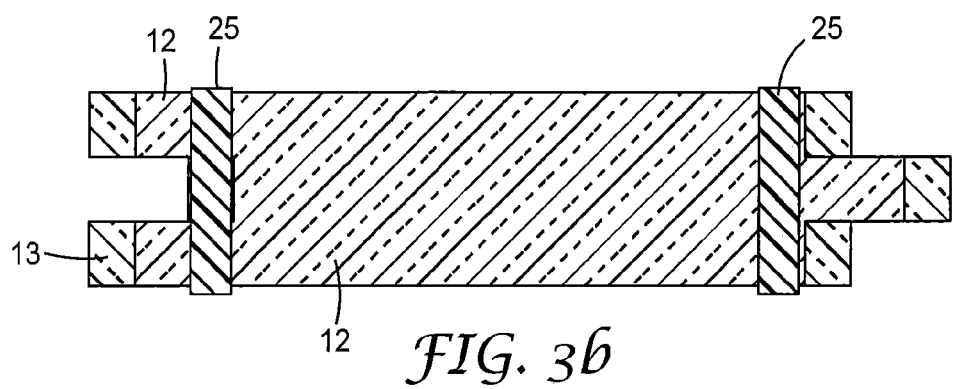
FIG. 3b is a diagrammatic top view of a two layer mat according to a second embodiment of the present invention.

FIG. 3a is a diagrammatic side view of a two layer mat according to a second embodiment of the present invention, and FIG. 3b is a diagrammatic top view of a two layer mat according to a second embodiment of the present invention. The mat and first 12 and second 13 sheets are of the same general construction as described above in connection with the first embodiment of the present invention. In this second embodiment, the edge regions of the first 12 and second 13 sheets (which are not held together by the fixation means 22) are held together by a holding means 25 comprising a narrow band or bands arranged around the outer surfaces 16, 17 of the edge regions 18, 19 of the first 12 and second 13 sheets. The bands 25 are formed from thin strips of material with the ends of the strips are bonded together to form a band. The bands 25 are arranged such that the edge regions of the sheets do not separate substantially during handling, and movement of the sheets parallel to each other in the region where the bands 25 are positioned is allowed during the wrapping process. The band 25 may be bonded to one of the outer surfaces 16, 17 of one of the first 12 and second 13 sheets such that the bands are held in position as an additional aid to maintaining the first 12 and second 13 sheets in position.

The bands 25 are required to have sufficient strength that they are not damaged during handling of the mat, but may fracture during the wrapping process. This means that although they may have good strength around the band, their resistance to shear forces may be weak. The bands 25 may be formed of a material that burns off at the operating temperature of a gas processing device, during use of the device, which is typically at a temperature of 200° or above. Rather than used in the form of a band, strips of material may be used as ties in the form of a loop with the ends tied together, of the ends bonded together on the same surface. Two bands are shown in FIGS. 3a and 3b, however, the quantity of bands used in the construction of a mat may vary depending on the size, shape and thickness of the sheets that are held together and the particular application. Preferably, the bands of material are strips of a paper material, plastic film or plastic or textile ribbon. Strips of tape, such as 3M Transfer Tape 950, available as above, can also be used as bands 25.

Figure 4A:
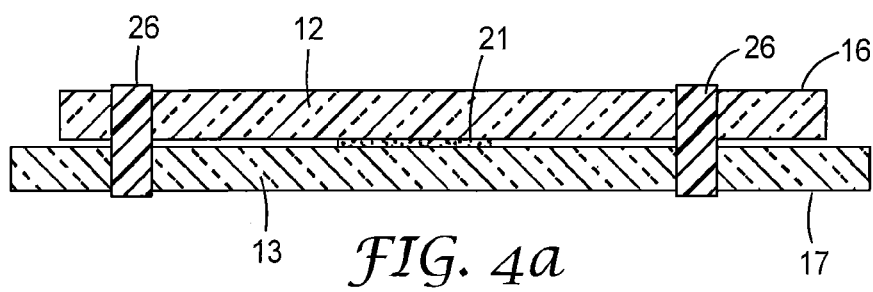
FIG. 4a is a diagrammatic side view of a two layer mat according to a third embodiment of the present invention.
Figure 4B:
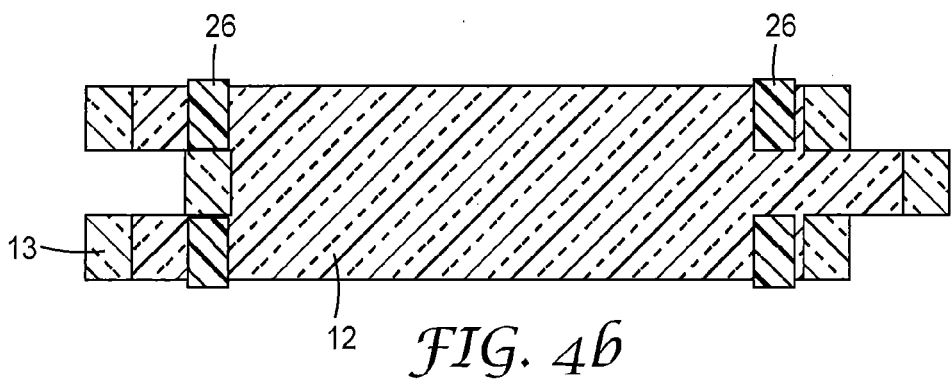
FIG. 4b is a diagrammatic top view of a two layer mat according to a third embodiment of the present invention.

FIG. 4a is a diagrammatic side view of a two layer mat according to a third embodiment of the present invention, and FIG. 4b is a diagrammatic top view of a two layer mat according to a third embodiment in accordance with the present invention. Again, the general construction of the mat and first 12 and second 13 sheets is as described above with respect to the first embodiment of the present invention. In this third embodiment the edge regions 18, 19 of the first 12 and second 13 sheets that are not held together by the fixation means 21 are held together by a holding means 26 comprising a narrow strip or narrow strips of material. The strips 26 are wrapped around the outer surface 17 of a first individual sheet 12 and adhered at both ends to the outer surface 16 of the second individual sheet 13. For example, the ends of the strip 19 may be adhered the outer surface 17 of the first individual sheet 12 forming the inner side of the mat, such that the strips 26 support the ends of the second individual sheet 13 forming the outer side of the mat, or vice versa. The strips 26 are arranged such that the edge regions of the sheets do not separate substantially during handling, and movement of the sheets parallel to each other in the region where the strips 26 are positioned is allowed during the wrapping process. The ends of the strips are adhered to the first 12 and second 13 sheets by means of an adhesive tape such as 3M Transfer Tape 950, available as above. The tape has sufficient strength and adhesion to the sheets during handling but may fracture during the wrapping process and burn off at the operating temperature of a gas processing device, typically above 200° C., during use of the device.

The strips 26 are also required to have sufficient strength that they are not damaged during handling of the mat, but may also fracture during the wrapping process. The strips may also be formed of a material that burns off at the operating temperature of a gas processing device, during use of the device. Two strips are shown in FIGS. 4a and 4b, however, the quantity of strips used in the construction of the mat may vary depending on the size, shape and thickness of the sheets that are held together and the particular application. This embodiment therefore differs from the second embodiment described above in that the ends of the strip 26 are not joined or bonded together, in contrast to the ends of the bands 25 being joined or bonded together.

The holding means second and third embodiments of the present invention are described as narrow bands or narrow strips of materials. An alternative in both of these embodiments is the use of wide bands or strips of material for the purpose of holding the sheets of the mat together. The width of the bands or strips is chosen such that the edge regions of the sheets do not separate substantially during handling, and movement of the sheets parallel to each other in the region where the bands or strips are positioned is allowed during the wrapping process. The materials chosen for wide bands or strips is required to have suitable properties to enable them to follow the form of the mat during the wrapping process without affecting the efficient wrapping of the mat or causing damage to the mat. For example, a band or strip formed from thin paper or a thin flexible or elastic plastic film that has sufficient strength that they are not damaged during handling of the mat, but may also fracture during the wrapping process, may be used. The bands or strips may be sufficiently wide that only two are required at opposite edges of the mat. These holding means may be used in conjunction with or without a fixation means. Alternatively, the holding means could be a band or strip with a length similar to that of the mat such that only one band or strip is required to hold the sheets together during handling. Similarly, a single holding means may be used in conjunction with or without a fixation means.

The bands 25 or strips 26 described above may be printed with information, part numbers, or machine or operator readable codes, as desired.

Figure 5A:
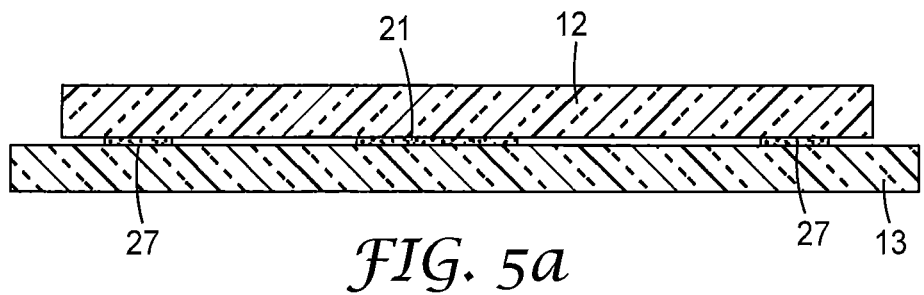
FIG. 5a is a diagrammatic side view of a two layer mat according to a fourth embodiment of the present invention.

FIG. 5a is a diagrammatic side view of a two layer mat according to a fourth embodiment of the present invention.

Figure 5B:
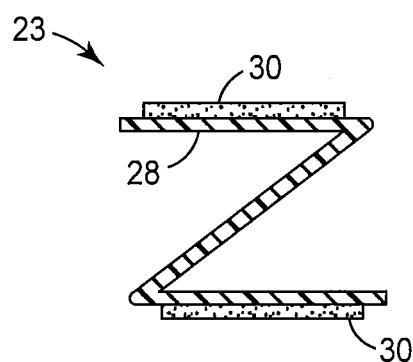
FIG. 5b is a diagrammatic tab having a "Z" shaped cross-section according to the fourth embodiment of the present invention.
Figure 5C:
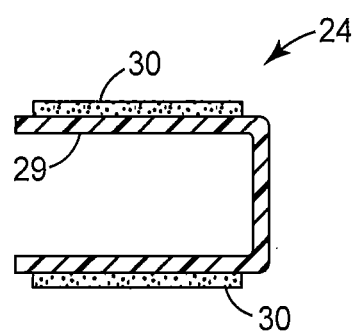
FIG. 5c is a diagrammatic tab having a "U" shaped cross-section according to the fourth embodiment of the present invention.

The general construction of the mat and the first 12 and second 13 sheets, are the same as described in relation to the first embodiment above. In this fourth embodiment, the edge regions of then first 12 and second 13 sheets that are not held together by a fixation means 21 are held together by a holding means comprising a tab 27 or tabs adhered to the inner surfaces 14, 15 of the sheets 12, 13. FIG. 5*b* is a diagrammatic tab having a "Z" shaped cross-section according to the fourth embodiment of the present invention and FIG. 5*c* is a diagrammatic tab having a "U" shaped cross-section according to the fourth embodiment of the present invention. A "Z"-shaped tab 28 can be formed by folding a single strip of material into three regions, and bonding a surface of the first region to the first sheet 12, and the opposite surface of the third region to the second sheet 13. A "U"-shaped tab 29 can be formed by folding a single strip of material into three regions, and bonding a surface of the first region to the first sheet 12, and the same surface of the third region to the second sheet 13. Each tab 28, 29 is a flexible linkage formed from thin material with an adhesive layers 30 applied to the surfaces of the tabs 28, 29 that will contact and bond to the first 12 and second 13 sheets. The tabs 28, 29 are adhered between the first and second sheets 12, 13 such that the edge regions 18, 19 of the sheets 12, 13 do not separate substantially during handling, and movement of the sheets 12, 13 parallel to each other in the region where the tabs 28, 29 are positioned is allowed during the wrapping process. The tabs 28, 29 need to have sufficient strength that they are not damaged during handling of the mat, but may fracture during the wrapping process. Although two tabs 28, 29 are shown in FIG. 5*a*, however, the quantity of tabs 28, 29 used in the construction of the mat may vary depending on the size, shape and thickness of the sheets 2, 3 that are held together and the particular application, for example, four tabs 28, 29 may be used instead. The types of tabs 28, 29, whether "Z"-shaped or "U"-Shaped can be interchanged as well if desired. Strips of paper, plastic film, tape or ribbon are suitable for forming the tabs, with an adhesive such as 3M Transfer Tape 950, available as above, used to bond the tabs 28, 29 to the first 12 and second 13 sheets.

Figure 6:
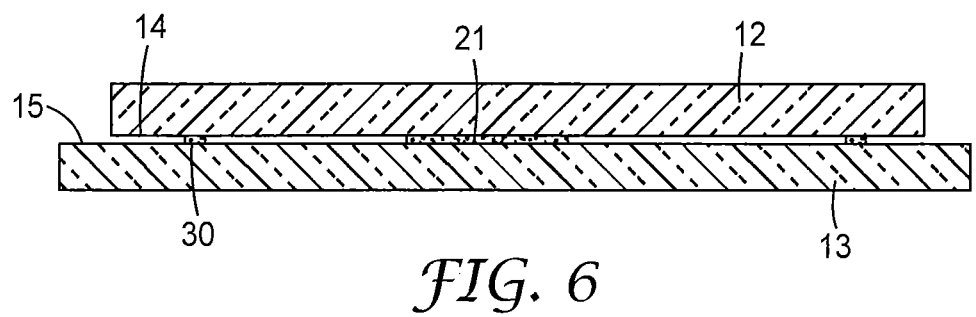
FIG. 6 is a diagrammatic side view of a two layer mat according to a fifth embodiment of the present invention.

FIG. 6 is a diagrammatic side view of a two layer mat according to a fifth embodiment of the present invention. The general construction of the mat and first 12 and second 13 sheets is the same as that described in relation to the first embodiment above. In this fifth embodiment the edge regions of the first 12 and second 13 sheets that are not held together by the fixation means 21 are held together by a holding means 30 comprising discrete adhesive zones applied to the inner surfaces 14, 15 of the first 12 and second 13 sheets. The discrete adhesive zones 30 comprise spots of hot melt adhesive material (3M 3731 or 3M 3748, available from 3M, 3M Center, St. Paul, Minn. 55144-1000, USA) that have sufficient strength and adhesion to the sheets such that the edge regions of the sheets can not separate substantially during handling. The adhesive zones 30 break upon wrapping around a body, such as a pollution control element, which allows movement of the first 12 and second 13 sheets parallel to each other in the region where the holding means is positioned. The adhesive may be chosen such that the adhesive may burn off at the operating temperature of a gas processing device, during use of the device. Two adhesive zones are shown in FIG. 6, however, the size of the adhesive zones and the quantity of adhesive spots in the zones and/or number of zones used in the construction of the mat may vary depending on the size, shape and thickness of the sheets that are held together and the particular application.

Figure 7:
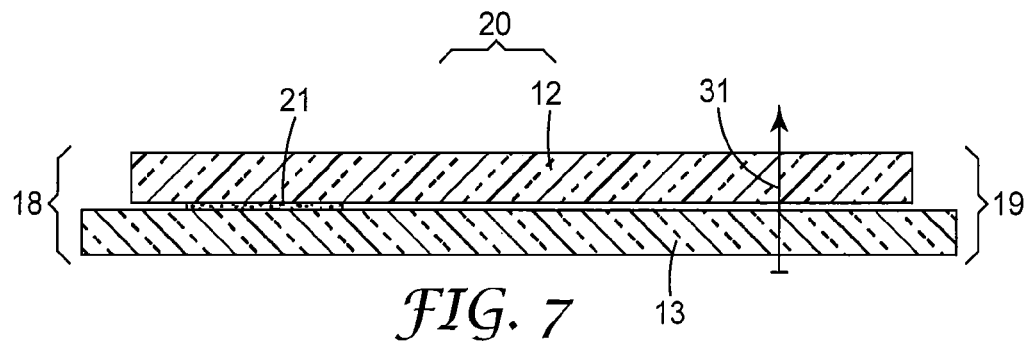
FIG. 7 is a diagrammatic side view of a two layer mat according to a sixth embodiment of the present invention.

FIG. 7 is a diagrammatic side view of a two layer mat according to a sixth embodiment. In this sixth embodiment the fixation means 21 between the first 12 and second 13 sheets is off-set towards one of the edge regions 18, 19 of the first 12 and second 13 sheets and not in the central region 20 of the mat. A holding means 31 holds the sheets together at the opposite edge region of the sheets not held together by the fixation means 21. Any of the holding means described above in relation to the first to the fifth embodiments of the present invention may be used. For certain applications it may also be necessary to provide additional holding means (not shown) at the central region 20 of the mat, to avoid separation of the first 12 and second 13 sheets at this central region 20 of the mat during handling. Again, any of the holding means described above in relation to the first to the fifth embodiments of the present invention may be used. A single holding means 31 is shown in FIG. 7, however, the type and quantity of holding means used in the construction of the mat may vary depending on the size, shape and thickness of the first 12 and second 13 sheets that are held together and the particular application. Applying the fastening means 21 towards one edge region of the sheets is advantageous as only one holding means may be necessary, depending on the holding means chosen. If more than one holding means is used, a first type and a second, different, type of holding means may be used.

In the above embodiments, the fixation means 9 is an adhesive, provided by a transfer tape. However, other types of adhesive, such as a hot melt adhesive, a pressure sensitive adhesive, a double sided adhesive tape between the sheets an adhesive tape wrapped around the outer surfaces of the central region of the mat or a spray adhesive may be used instead. In particular, a hot melt adhesive (3M 3731 or 3M 3748) or a spray adhesive (3M 74, again available from the 3M address detailed above) may be used in preference to the transfer tape. Alternatively, a mechanical fixation means may be used. If a mechanical fixation means is used, then it is acceptable for the first 12 and second 13 sheets to be held together in the same manner as any of the holding means described in the first to fifth embodiments of the present invention above. For example, threads, bands, strips, staples, pins, ties or flexible linkages could be used as holding means A mounting mat where the sheets are held together using holding means only would have the advantage in manufacture that only one fixation process would need to be applied to construction of the mounting mat.

The above embodiments show examples of mounting mats comprising two sheets. However mounting mats may comprise two, three, four or more sheets depending on the application, the size of the pollution control element being wrapped or the size of space between the pollution control element and the housing that needs to be filled.

Figure 8:
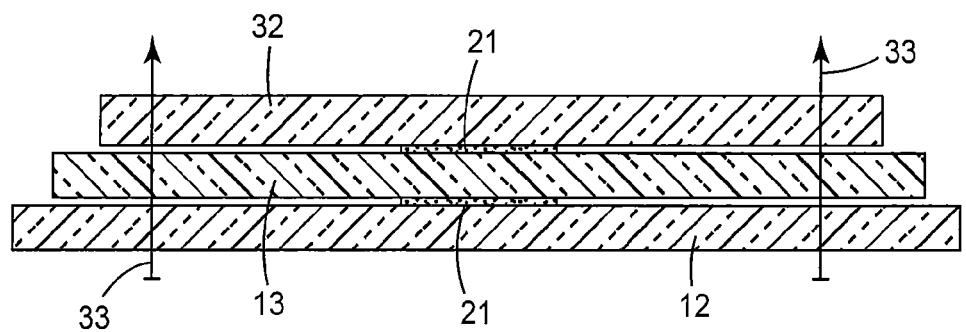
FIG. 8 is a diagrammatic side view of a three layer mat, comprising the holding means according to the first embodiment of the present invention.

FIG. 8 is a diagrammatic side view of a three layer mat, comprising a holding means according to the first embodiment of the present invention. It can be seen that the same threads 13 as those applied to the two layer mat of the first embodiment can be applied to a mat comprising first 12, second 13 and third 32 sheets. For such a multilayer mat, the threads 33 penetrate through all of the sheets 12, 13, 32 to hold them all together.

Figure 9:
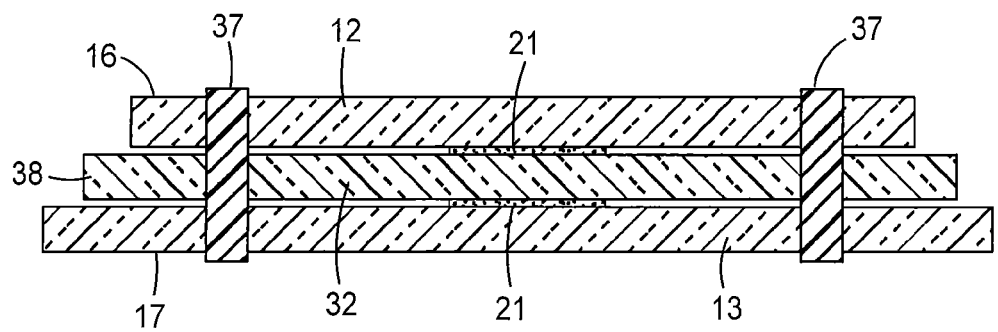
FIG. 9 is a diagrammatic side view of a three layer mat, comprising the holding means according to the second or third embodiments of the present invention.

Likewise, FIG. 9 is a diagrammatic side view of a three layer mat, comprising a holding means according to the second or third embodiments of the present invention. The same band or strip holding means to that applied to the two layer mat of either the second or the third embodiments can be applied to a mounting mat comprising first 12, second 13 and third 32 sheets: FIG. 9 shows a holding means 37 applied around the outer surfaces 16, 17 of three sheets 12, 13, 32. Where a band is used as the holding means 37, the band may be adhered to any one of the sheets to keep it in position during handling. The adhesive could be applied to any of the outer surfaces of the first sheet 12 (forming the inner surface of the mat) or the second sheet 13 (forming the outer surface of the mat), or a side 40 of the third (and central) sheet 32. Where a strip is used as the holding means 37, the ends of the strip may be adhered to either the outer surface 17 of the second sheet 13 or the outer surface 16 of the first sheet 12.

Figure 10:
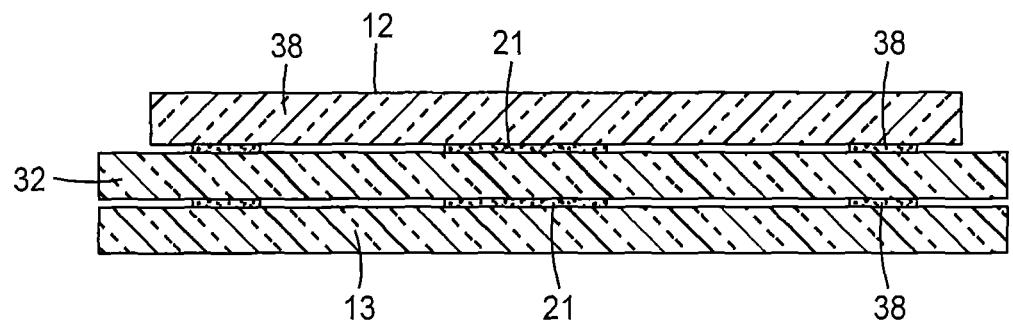
FIG. 10 is a diagrammatic side view of a three layer mat, comprising the holding means according to the fourth or fifth embodiments of the present invention.

FIG. 10 is a diagrammatic side view of a three layer mat, comprising a holding means according to the fourth or fifth embodiments of the present invention. A tab holding means, the same as that applied to the two layer mat of either the fourth or the fifth embodiments, can applied to a mounting mat comprising first 12, second 13 and third 32 sheets. For such a multilayer mat, the holding means 38 would need to be applied between each of the sheets 12, 13, 32, such that all the sheets are held together.

It will be apparent to those skilled in the art that the holding means of any of the first to fifth embodiments could be applied to multilayer mounting mats comprising two, three, four or more sheets.

It may be desirable for the first, second and third (where applicable) sheets forming the mat to be of different sizes, for example, the larger size sheet is the outer most sheet relative to the pollution control element, resulting in a larger diameter when wrapped around a pollution control element. This may enable a better fit and improved sealing in the area where the ends of the sheets come together and reduces the possibility of gas leakage around the sealing area. The sheets may be square or generally rectangular in shape, having opposite edges, or may have a tongue portion is provided on one edge of a sheet to form a mating fit with a cut out portion provided at the other opposite edge of the sheet, as shown in FIGS. 2b, 3b and 4b. Such features may also improve the sealing efficiency of the mats when in use, by reducing any gas leakage paths around the area where the ends of the sheets join. However, the sheets may be generally rectangular without the tongue features, or provided with other features to aid in sealing that are known in the art.

The dimensions and shape of each sheet may be the same or different, as desired by design or application. The dimensions of the sheets of material from which mounting mats are formed are dependent on the application and more particularly on the dimensions of the pollution control element and the housing. The thickness of each sheet is typically, but not limited to, the range from 4 mm to 10 mm. The dimension of the sheets is typically, but not limited to the range from 4 cm to 40 cm wide and from 30 cm to 120 cm long.

Where the mounting mats are rectangular having opposite long edges and opposite short edges, the sheets of the mats may be off-set widthways, that is, the opposite long edges are not aligned, as well as lengthways, that is, the opposite short edges are not aligned. For certain canning processes, in particular for a method know as "stuffing", it may be advantageous for the sheets of the mats to be off-set both widthways and lengthways. During the stuffing process it is common to place both the mat and the pollution control element into a funnel to be pressed into a container. During this process it is possible for the mat to shear, such that after stuffing the edges of the mat are not aligned with the pollution control element. This results in a reduction in holding efficiency of the mat and makes the mat more vulnerable to edge erosion by exhaust gases. Off-setting the mats widthways may reduce the likelihood of shearing during the stuffing process. Off-setting the mats lengthways may provide a better seal around the exterior of the pollution control element. Consequently it may be desirable for at least one edge of one of the first 12 or second 13 mats to be offset from the corresponding edge of the other of the first 12 or second 13 mats.

The present invention can be applied to multilayered intumescent mounting mats, multilayered non-intumescent mounting mats, or mounting mats comprising a combination of intumescent and non-intumescent layers. The material used to form the sheets depends on the application, including factors such as the temperature range to which the sheets will be exposed to during use and the type of pollution control element to be mounted. Suitable intumescent sheet materials typically comprise inorganic fibers such as refractory ceramic fibers, biosoluble ceramic fibers, glass fibers or blends thereof, unexpanded vermiculite, and a binder such as styrene-butadiene lattices or methacrylate polymers. Suitable non-intumescent sheet materials typically comprise inorganic fibers such as polycrystalline fibers, glass fibers or amorphous ceramic fibers and an organic binder such as an acrylate polymer. Suitable materials as known to a person skilled in the art may be used. Exemplary mat materials, such as those described above, are proposed by U.S. Pat. No. 3,916,057, U.S. Pat. No. 4,305,992, and EP 1,495,807 to which reference should be made.

Figure 11:
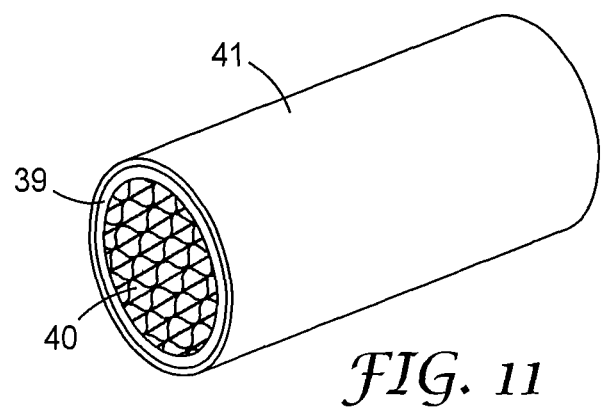
FIG. 11 is a diagrammatic illustration of a pollution control device/exhaust gas processing device.

Typically, a pollution control element is formed from a ceramic or stainless steel honeycomb structure that supports a coating of a catalyst material, such as platinum, palladium and rhodium. The housing may be formed from a pressed or rolled stainless steel casing, which houses the delicate element, protected by a mounting mat. FIG. 11 is a diagrammatic illustration of a pollution control device. The mounting mat 39 is shown in its fitted position, disposed within a gap defined between a pollution control element 40 and a housing 41. The pollution control device is made by taking the mounting mat 39 and wrapping it around the pollution control element 40, and arranging it within the gap between the pollution control element 40 and the housing 41 at a processing station. This is done by inserting the pollution control element 40 surrounded by the mat 39 into the housing 41. An automated carrying means, such as a robot, is used to transport the mounting mat between a holding area, where the mats are stored in a pile, to the processing station. Any of the mats according to the embodiments of the present invention described above may be used to form a pollution control device, or be used in forming a pollution control device.

The invention claimed is:

1. Mounting mat for a pollution control device, said mat comprising:
   at least a first sheet and a second sheet, with each sheet having a different width dimension, length dimension, or both width and length dimensions;
   fixation means only positioned in a central region of the mat, where the fixation means is adapted to hold together the at least first and second sheets substantially in contact with each other such that movement of the at least first and second sheets in a direction perpendicular to the plane of the at least first and second sheet is substantially restricted in the central region of the mat;
   holding means for holding the at least first and second sheets together at opposite edge regions of the mat, such that the holding means is adapted to: (i) hold the at least first and second sheets together whilst allowing movement of the at least first and second sheets parallel to each other in the opposite edge regions of the mat;

and/or (ii) to break upon wrapping around a body thereby allowing movement of the at least first and second sheets parallel to each other in the opposite edge regions of the mat.

2. Mounting mat according to claim 1, comprising at least three holding means positioned on the mat such that the sheets are held together at opposite edge regions of the mat and a region between the opposite edge regions of the mat.

3. Mounting mat according to claim 2, comprising holding means of a first type and holding means of a second type.

4. Mounting mat according to claim 1, comprising holding means of a first type and holding means of a second type.

5. Mounting mat according to claim 1, wherein the holding means are one of: pins, staples, ties, bands, threads, regions of adhesive and flexible linkages.

6. Mounting mat according to claim 1, wherein the fixation means comprises at least one zone of adhesive.

7. Mounting mat according to claim 1, wherein the holding means are formed of a material that burns off at a temperature exceeding 200° C.

8. Mounting mat according to claim 1, wherein at least one edge of one of the at least first and second sheets is offset from the corresponding edge of the other of the at least first and second sheets.

9. Mounting mat according to claim 1, wherein the first and second sheets comprise non-woven sheets of inorganic fibres.

10. Mounting mat according to claim 1, wherein the first sheet and/or the second sheet comprises an intumescent material.

11. Mounting mat according to claim 1, wherein the first sheet and/or the second sheet comprises a non-intumescent material.

12. A pollution control device comprising:
a housing;
a pollution control element arranged within the housing; and
a mounting mat according to claim 1, wherein the mounting mat is disposed in a gap defined between the housing and the pollution control element.

13. A method of making a pollution control device, said method comprising:
providing a mounting mat in accordance with claim 1;
wrapping the mounting mat around a pollution control element; and
arranging the mounting mat and pollution control element within a housing.

14. Method of making a pollution control device according to claim 13, wherein the mounting mat is transferred from a storage area to a processing area by an automated carrying means.

15. Method of making a pollution control device according to claim 14, wherein the automated carrying means is a robot.

16. Mounting mat for a pollution control device, said mat comprising:
at least a first sheet and a second sheet, with each sheet having a different width dimension, length dimension, or both width and length dimensions;
fixation means only positioned at an edge region of the mat, where the fixation means is adapted to hold together the at least first and second sheets substantially in contact with each other such that movement of the at least first and second sheets in a direction perpendicular to the plane of the at least first and second sheet is substantially restricted at the edge region of the mat;
holding means for holding the at least first and second sheets together at an opposite edge region of the mat, such that the holding means is adapted to: (i) hold the at least first and second sheets together whilst allowing movement of the at least first and second sheets parallel to each other in the opposite edge region of the mat; and/or (ii) to break upon wrapping around a body thereby allowing movement of the at least first and second sheets parallel to each other in the opposite edge region of the mat.

17. Mounting mat according to claim 16, wherein at least one edge of one of the at least first and second sheets is offset from the corresponding edge of the other of the at least first and second sheets.

18. Mounting mat according to claim 16, wherein the first and second sheets comprise non-woven sheets of inorganic fibres.

19. Mounting mat according to claim 16, wherein the first sheet and/or the second sheet comprises an intumescent material.

20. Mounting mat according to claim 16, wherein the first sheet and/or the second sheet comprises a non-intumescent material.

* * * * *

UNITED STATES PATENT AND TRADEMARK OFFICE
CERTIFICATE OF CORRECTION

PATENT NO. : 9,605,576 B2
APPLICATION NO. : 13/395930
DATED : March 28, 2017
INVENTOR(S) : Ulrich Kunze It is certified that error appears in the above-identified patent and that said Letters Patent is hereby corrected as shown below:

On the Title Page

Column 1, under Item (65) "Prior Publication Data" insert:
-- Foreign Priority Data
EP 09170723.2 09/18/2009 --

In the Specification

Column 7, Line 4, delete "then" and insert -- the --, therefor.

Column 9, Line 57, delete "know" and insert -- known --, therefor.

Signed and Sealed this
Tenth Day of April, 2018

Andrei Iancu
*Director of the United States Patent and Trademark Office*